United States Patent [19]
Chattin

[11] Patent Number: 6,032,968
[45] Date of Patent: Mar. 7, 2000

[54] HYDRAULIC TRANSMISSION FOR BICYCLES

[75] Inventor: Jesse Chattin, Tampa, Fla.

[73] Assignee: Chattin Hydro-Cycle, Inc., Tampa, Fla.

[21] Appl. No.: 08/810,603

[22] Filed: Feb. 28, 1997

[51] Int. Cl.[7] ...................................................... B62M 1/10
[52] U.S. Cl. ........................... 280/216; 280/259; 418/205
[58] Field of Search ..................................... 280/216, 215, 280/214, 259, 260; 180/305; 60/400–402, 419; 418/191, 205, 206.1; 417/231

[56] References Cited

U.S. PATENT DOCUMENTS

| | | | |
|---|---|---|---|
| 732,908 | 7/1903 | Thomson | 280/216 |
| 4,249,750 | 2/1981 | Kantner | 418/165 |
| 4,290,621 | 9/1981 | Davey | 280/216 |
| 4,684,143 | 8/1987 | Sato | 280/216 |
| 4,688,815 | 8/1987 | Smith | 418/159 |
| 5,387,000 | 2/1995 | Sato | 417/273 |

FOREIGN PATENT DOCUMENTS

| | | | |
|---|---|---|---|
| 537981 | 5/1955 | Belgium | 280/216 |

*Primary Examiner*—Anne Marie Boehler
*Attorney, Agent, or Firm*—Stein, Schifino & Van Der Wall

[57] ABSTRACT

A drive mechanism for a bicycle comprising a pump unit driven by the rotation of the bicycle pedals, a hydraulic motor driven by the pump unit, a conduit system creating a closed hydraulic system for circulating hydraulic fluid between the pump unit and the hydraulic motor, and a pressure regulator for controlling the flow of hydraulic fluid from the pump unit to the hydraulic motor and thereby controlling the speed at which the bicycle is propelled. The pump unit has a first gear assembly having teeth with a face width $w_1$ and a whole depth $d_1$ and the hydraulic motor has a second gear assembly having teeth with a face width $w_2$ and a whole depth $d_2$. The teeth upon the respective gear assemblies mesh together to form inter-tooth pockets which facilitates hydraulic fluid transfer about the closed hydraulic system. The rotary motion relationship between the first and second gear assemblies of the present invention, as defined by their respective teeth, may vary from approximately 2.5:1 to approximately 18:1.

13 Claims, 5 Drawing Sheets

HYDRAULIC TRANSMISSION FOR BICYCLES

BACKGROUND OF THE INVENTION

1. Field of the Invention

The present invention relates to drive mechanisms for bicycles. This invention more particularly pertains to a hydraulic drive mechanism to propel a bicycle.

2. Description of the Background Art

Presently, most commercially available bicycles utilize a drive chain about a chain ring, driven by a crank axle and pedals, and a rear section gear cluster which is attached to the hub of the rear wheel to transmit power from the manually operated pedals to the rear wheel of the bicycle. For multi-speed bicycles, front and rear chain deraileurs cooperate with each other and in conjunction with a tensioning wheel to shift the drive chain from gear sprockets of varying diameters which results in the bicyclist being able to rotate the pedals at varying rates.

However, many hydraulic driven bicycles are known. For example, U.S. Pat. No. 4,249,750 to Kantner discloses a combination pump and motor for a hydraulic driven bicycle. Each pump and motor includes a plurality of fluid-pressure zones wherein one is a low pressure zone and another is a high pressure zone. Rotators in contact with one another, wherein one rotator has a smooth surface and another has a gear-like surface, transfer fluid from one zone to another zone. The rotators are arranged so that adjacent rotators are in contact and create a fluid-displacement path at the interface therebetween adjacent rotators. The Kantner patent discloses rotators in the pump having a 1:1 relationship with the rotators in the motor.

U.S. Pat. No. 4,688,815 to Smith teaches a hydraulic driven bicycle driven by a hydraulic pump and a hydraulic drive mechanism. The hydraulic pump has a pump chamber that may be varied in size for varying the flow of fluid through the pump mechanism. The drive mechanism has a drive chamber that also may be varied in size for varying the flow of fluid through the drive mechanism. However, this reference does not disclose a hydraulic drive means for propelling bicycles as disclosed by the present invention.

U.S. Pat. No. 4,290,621 to Davey discloses a bicycle employing a hydraulic multi-speed drive mechanism comprising a multi-chambered pump and a multi-chambered motor wherein selection of each chamber controls the amount of passing fluid and, hence, the speed of the bike is affected. Moreover, the patent to Davey discloses how to permit removal of the rear wheel from the bicycle without interrupting the hydraulic circuit. However, the present inventor believes the bicycle disclosed in the patent to Davey could not possibly work effectively because of the dimensional characteristics affecting the transmission of hydraulic fluid and, ultimately, the rotary motion of the complete hydraulic drive mechanism.

In response to these earlier hydraulic driven bicycles, it became clear that there is a need for an improved hydraulic drive mechanism. This device must provide for a smooth transition from a resting position to high speed without the usual shifting of gears as is encountered on conventional multi-speed bicycles.

In as much as the art consists of various types of bicycles, it can be appreciated that there is a continuing need for and interest in improvements to hydraulic driven bicycles, and in this respect, the present invention addresses these needs and interests.

Therefore, the principal object of this invention is to provide an improvement which overcomes the inadequacies of the prior art devices and provides an improvement which is a significant contribution to the advancement of hydraulic driven bicycles.

Another object of this invention is to provide a new and improved hydraulic drive means for bicycles which has all the advantages and none of the disadvantages of the earlier hydraulic driven bicycles.

Still another objective of the present invention is to provide a hydraulic bicycle that is lightweight and easily ridden.

Yet another objective of the present invention is to provide a hydraulic bicycle that is easily manufactured and assembled.

Still a further objective of the present invention is to provide a hydraulic bicycle capable of a smooth transition from a stationary position to a higher speed without the usual shifting of gears.

Yet a further objective is to provide a hydraulic drive mechanism that requires minimal maintenance for the biker.

An additional objective is to provide a pump that is powered by the conventional pedal and brake arrangement.

Another objective is to provide a drive mechanism for a bicycle having a frame comprising of a seat tube, seat stay and chain stay, a pedal means for applying manual power to propel the bicycle, a drive wheel rotatably supported on the frame, and a drive mechanism connected to the pedal means for rotating the drive wheel, an improved drive mechanism comprising a pump unit comprising a pump housing, a first gear assembly operationally disposed within the pump housing and driven by the rotation of the pedal means outside of the pump housing, the pump unit outwardly adjacent the seat tube and the chain stay; a hydraulic motor being supported on the frame, the hydraulic motor comprising a motor housing and a second gear assembly operationally disposed within the motor housing, the second gear assembly adapted to engage the drive wheel, the hydraulic motor outwardly adjacent the seat stay and the chain stay and driven by the hydraulic fluid pumped by the pump unit, the pump unit and the hydraulic motor having a rotary motion relationship in the range of approximately 2.5:1 up to approximately 18:1; conduit means coupled between the hydraulic motor and the pump unit for circulating hydraulic fluid through the pump unit and the hydraulic motor, the conduit means creating a closed hydraulic system; pressure regulator means in the closed hydraulic system for controlling the quantity of hydraulic fluid transmitted to the hydraulic motor when the pedal means is rotated; and a hydraulic fluid reservoir disposed above the pump unit, the conduit means coupled to and in fluid communication with the reservoir.

Even yet another objective is to provide a drive mechanism for a bicycle having a frame comprising of a seat tube, seat stay and chain stay, a pedal means for applying manual power to propel the bicycle, a drive wheel rotatably supported on the frame, and a drive mechanism connected to the pedal means for rotating the drive wheel, an improved drive mechanism comprising a pump unit comprising a pump housing and a first gear assembly, the first gear assembly comprising a pump idler gear and pump bull gear in rotational meshing contact with one another and operationally disposed within the pump housing, the pump bull gear driven by the rotation of the pedal means outside of the pump housing, the pump unit outwardly adjacent the seat tube and the chain stay; a hydraulic motor being supported on the frame, the hydraulic motor comprising a motor housing and a second gear assembly, the second gear assembly comprising a smaller pinion gear and a larger idle gear in rotational meshing contact with one another and operationally disposed within the motor housing, the smaller pinion gear adapted to engage the drive wheel, the hydraulic motor outwardly adjacent the seat stay and the chain stay and driven by the hydraulic fluid pumped by the pump unit, the pump unit and the hydraulic motor having a rotary motion relationship configured by varying combinations of the first and second gear assemblies, the first and second gear assemblies having teeth meshing together to form inter-tooth pockets, the inter-tooth pockets facilitating hydraulic fluid transfer, the teeth of the first and second gear assemblies having a face width and a whole depth defining approximately a 12:1 rotary motion relationship; a conduit means for transmitting hydraulic fluid from the pump unit to the hydraulic motor and returning the hydraulic fluid from the hydraulic motor to the pump unit, the conduit means comprising of a small diameter conduit line for transmitting hydraulic fluid from the pump unit and a large diameter conduit line for returning hydraulic fluid from the hydraulic motor, the conduit means creating a closed hydraulic system; pressure regulator means for controlling the quantity of hydraulic fluid transmitted to the hydraulic motor when the pedal means is rotated, the pressure regulator means comprising a hydraulic fluid bypass in the pump unit, the hydraulic fluid bypass having a spring-loaded plunger interposed in the bypass; and a hydraulic fluid reservoir disposed within the seat tube and above the pump unit, the large diameter conduit line having a first end coupled to the reservoir and in fluid communication with the reservoir.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiments shown in the attached drawings. The present invention is directed to an apparatus that satisfies the need for an improved hydraulic drive mechanism for bicycles. For the purpose of summarizing the invention, the invention comprises a pump unit comprising of an internal gear assembly driven by the rotation of the pedals by the bicycle rider. A hydraulic motor also comprises of an internal gear assembly for driving the rear wheel of the bicycle. A conduit creating a closed hydraulic system, including the pump unit and the motor, transmits hydraulic fluid from the pump unit to the hydraulic motor, and returns the hydraulic fluid from the motor to the pump. A hydraulic fluid reservoir is disposed in the seat tube below the bicycle seat and above the pump unit. Finally, the present invention comprises a pressure regulator for controlling the quantity of hydraulic fluid transmitted to the hydraulic motor. Means are provided for adjusting the spring tension so as to adjustably control the amount of bypassing hydraulic fluid and, therefore, the hydraulic pressure about the closed system. When the biker initially starts off pedaling, the bike will increase speed with the increasing hydraulic pressure, as a result of the bicyclist's pedaling, and the hydraulic pressure rises up to a certain point where the spring loaded plunger raises to allow hydraulic fluid to bypass the rotating gears in the pump unit. Once the hydraulic fluid starts bypassing, the hydraulic pressure is prevented from rising any higher while the bicyclist continues to pedal faster. The speed of the bike is controlled by the amount of hydraulic fluid flow and the acceleration is controlled by the pressure of the hydraulic fluid.

An important feature of the present invention is that a variable rotary motion relationship, for facilitating hydraulic fluid transfer about the closed hydraulic system, exists between the pump unit and the hydraulic motor which enables the bicyclist to smoothly and easily attain a high speed from a stationary position. After extensive investigation and experimentation, the present inventor has discovered that the effective range of the rotary motion relationship of the present invention varies from approximately 2.5 up to and including approximately 18:1. The ratio for a particular bicyclist depends ultimately upon the age of the bicyclist and the intended purpose of the bike. In other words, a child would need a lower ratio of about 2.5:1 and a racing cyclist would prefer a higher ratio of about 18:1.

Generally, it is particularly preferable that the rotary motion relationship be approximately 12:1. Simply, the present invention depends on the relation of the rotating gears in the pump unit and hydraulic motor to generate hydraulic pressure and facilitate hydraulic fluid about the closed hydraulic system. Therefore, it can be readily seen that the present invention provides a means to propel a bicycle without the necessity of shifting. Thus, a hydraulic driven bicycle comprising the present invention would be greatly appreciated.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
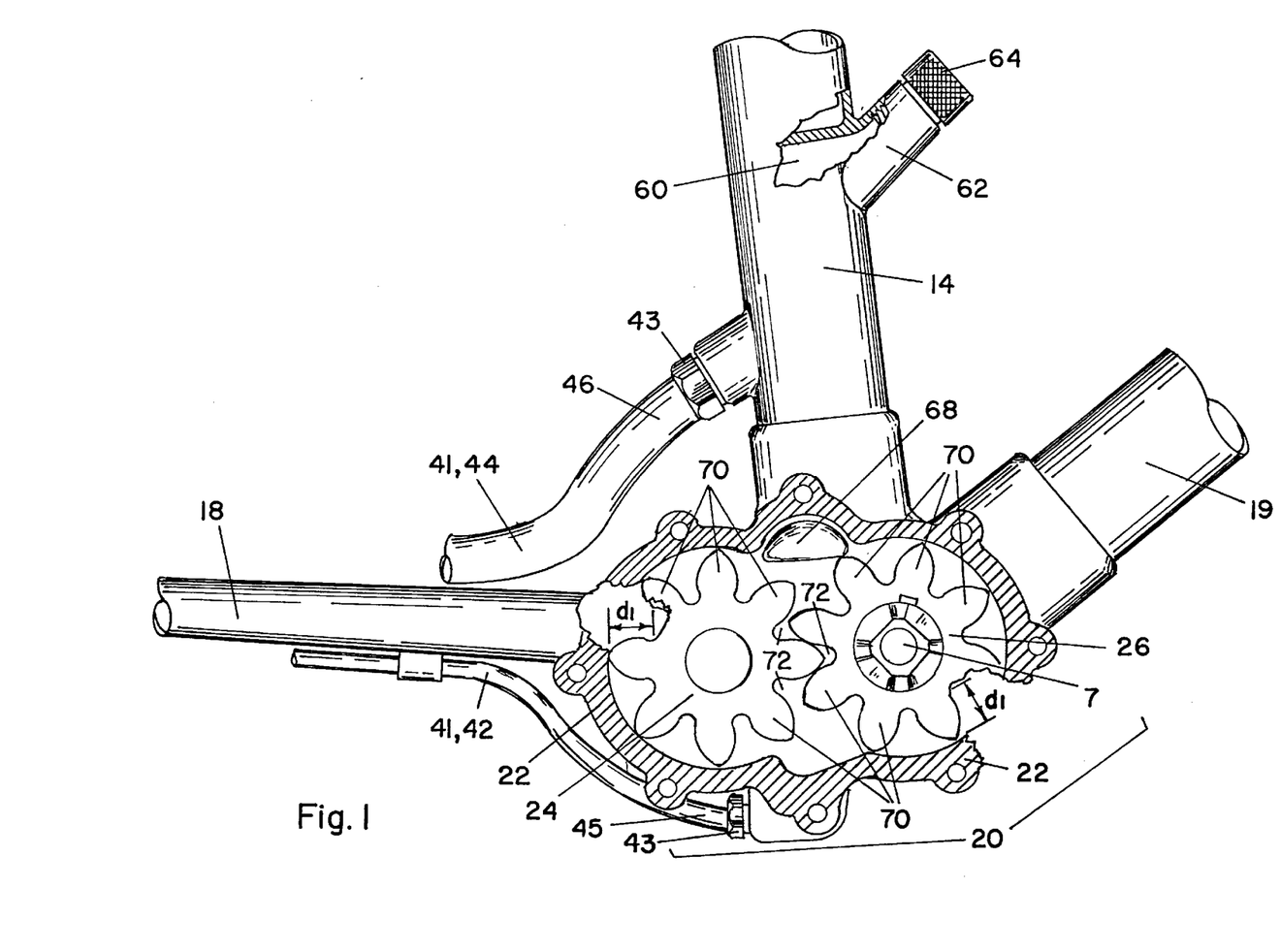
FIG. 1 is a side cross-sectional view of the pump unit of the present invention.
Figure 4:
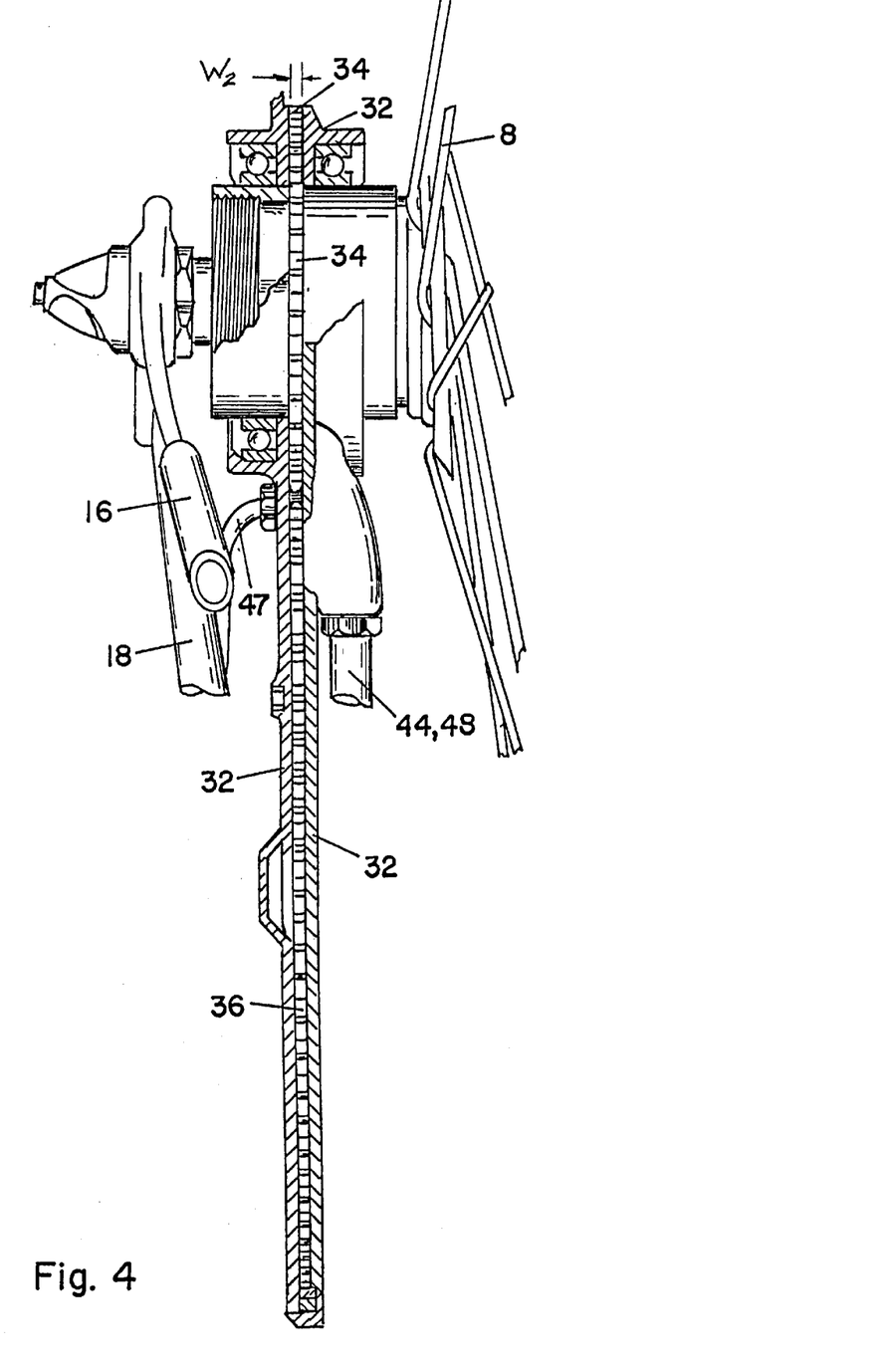
FIG. 4 is a top cross-sectional view of the hydraulic motor of the present invention.

With reference to the drawings, and in particular to FIGS. 1 and 4 thereof, a new and improved hydraulic drive mechanism embodying the principles and concepts of the present invention and generally designated by the reference number 10 will be described. The drive mechanism 10 is designed to replace the conventional chain drive utilized on most commercially available bicycles. Otherwise, the bicycle is a conventional bicycle utilizing pedals operated manually by the cyclist to drive the rear drive wheel.

The present invention comprises of a pump unit 20 which pumps hydraulic fluid, as a result of the bicyclist's rotation of the pedals 6, a hydraulic motor 30 mounted on the rear of the bike frame for driving the drive wheel 8, a hydraulic conduit system 42, 44 circulating hydraulic fluid back and forth between the pump unit 20 and the hydraulic motor 30, a pressure regulator means 52, 54 for controlling the quantity of hydraulic fluid transmitted to the hydraulic motor, and a hydraulic fluid reservoir 60 in the seat tube 14.

Figure 2:
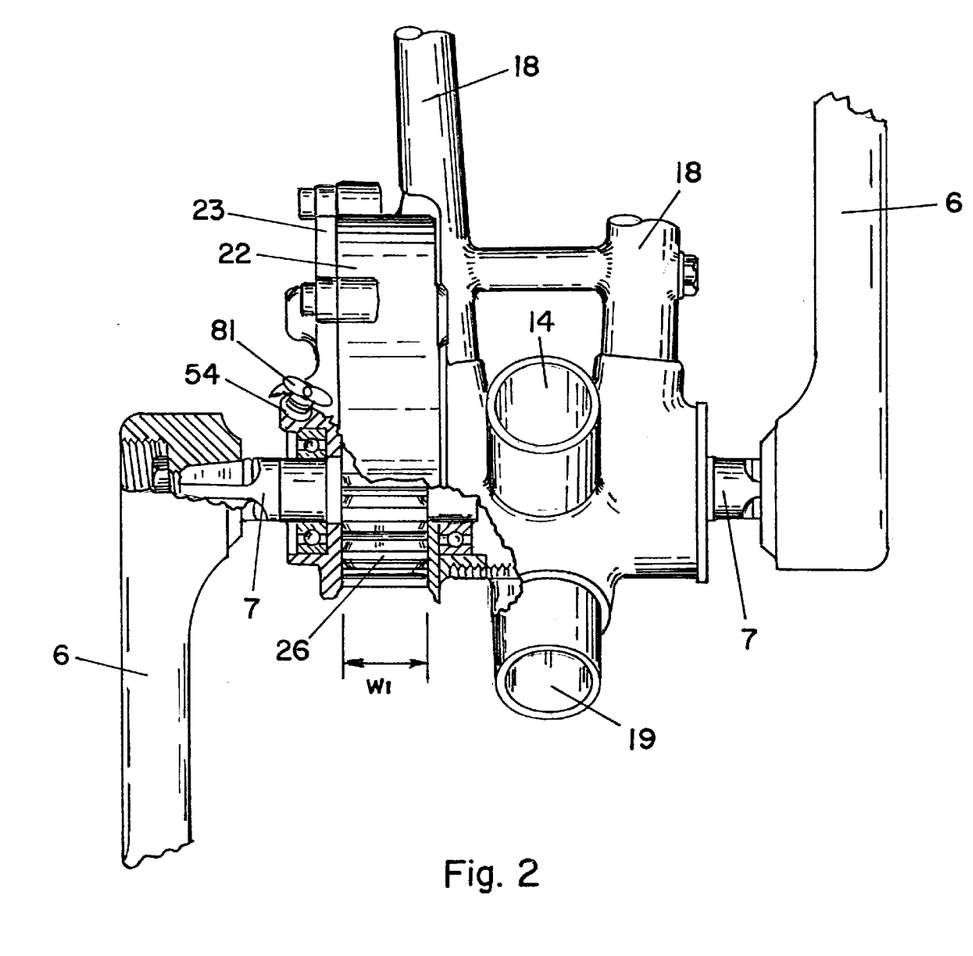
FIG. 2 is a top partial cross-sectional view of the pump unit of the present invention.

As shown in FIG. 1, the pump unit 20 comprises a pump housing 22 and a first gear assembly 24, 26. It is preferable that the pump unit 20 be made of steel, aluminum or other suitable material. The first gear assembly comprises a pump idler gear 24 and a pump bull gear 26 in rotational meshing contact with one another and operationally disposed within the pump housing 22. The pump housing 22 further comprises a cover plate 23, shown in FIG. 2, which provides access to the interior of the pump unit 20. The pump bull gear 26 is driven by the rotation of pedals 6, by the bicyclist, outside of the pump housing 22. FIG. 2 illustrates the pump unit 20 outwardly adjacent the seat tube 14 and the chain stay 18. The pedals 6 have crank arms which are connected to each end of a shaft 7 passing through the pump unit 20. The pump bull gear 26 is secured to the shaft 7 and the pump idler gear 24 is supported by a stub axle.

Figure 3:
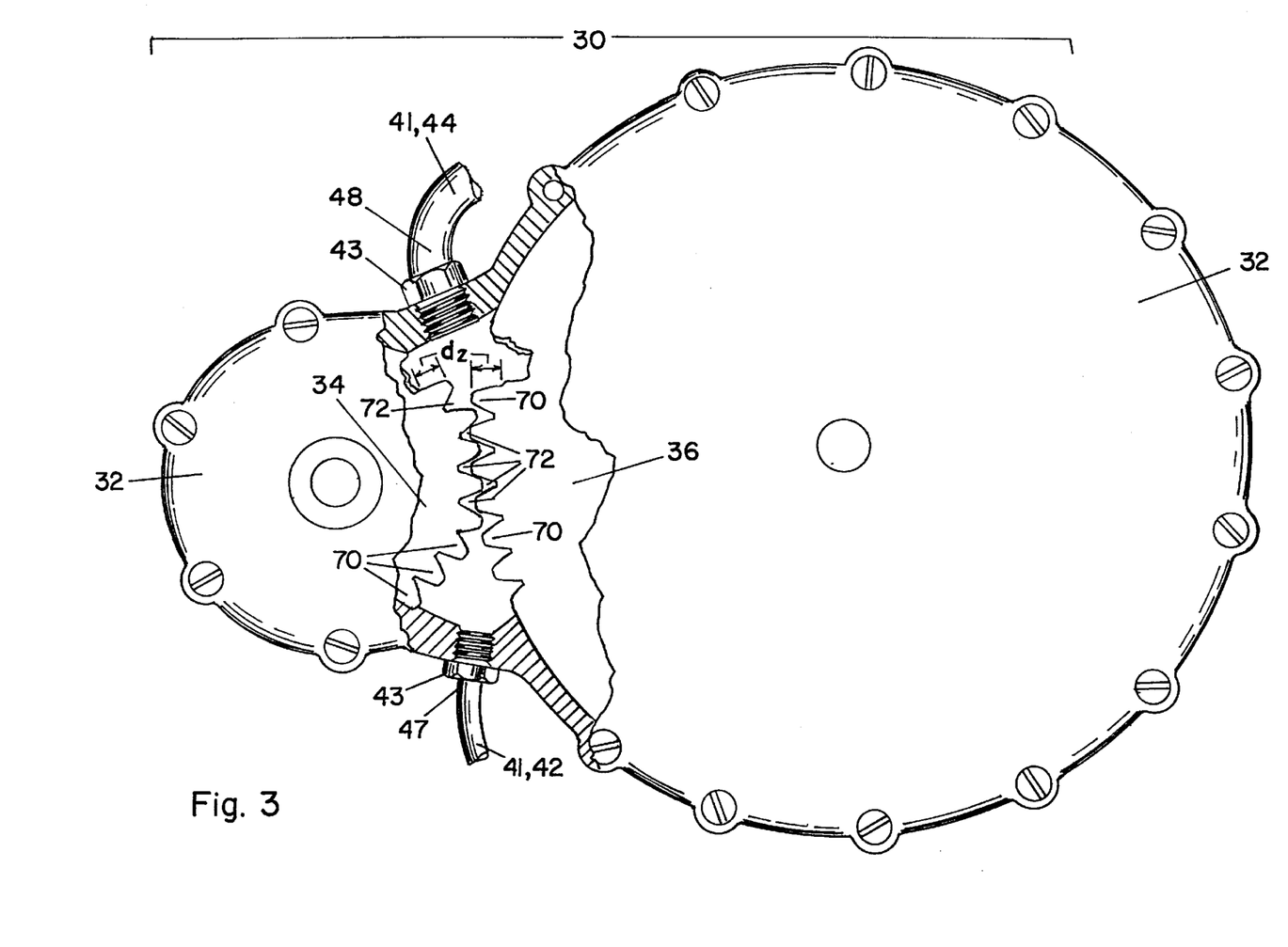
FIG. 3 is a side partial cross-sectional view of the hydraulic motor of the present invention.

As shown in FIGS. 3 and 4, the hydraulic motor 30 comprises of a motor housing 32 and a second gear assembly 34, 36. It is preferable that the hydraulic motor 30 be made of steel, aluminum or other suitable material. The second gear assembly comprises a smaller pinion gear 34 and a larger idle gear 36 in rotational meshing contact with one another and operationally disposed within the motor housing 32. It is preferable to have a gear 36 larger than the gear 34 because the larger the gear 36 the more leverage that is created. Therefore, a multiplication of force is directed to the drive wheel 8. The motor housing 32 includes a cover plate to provide access to the interior of the hydraulic motor 30. The smaller pinion gear 34 is adapted to engage the drive wheel 8. The hydraulic motor 30 is outwardly adjacent the seat stay 16 as well as the chain stay 18 and is driven by the hydraulic fluid pumped by the pump unit 20.

A hydraulic conduit system 42, 44 is coupled between the pump unit 20 and the hydraulic motor 30 for circulating hydraulic fluid through the pump unit 20 and the hydraulic motor 30. The hydraulic conduit system transmits hydraulic fluid from the pump unit 20 to the hydraulic motor 30 and then returns the hydraulic fluid from the hydraulic motor 30 to the pump unit 20. The conduit system 42, 44 creates a closed hydraulic system 41 whereby operation of the pump unit 20 causes the hydraulic fluid to circulate through the pump unit 20 and the hydraulic motor 30. It is preferred that one weight hydraulic fluid be used in the closed hydraulic system 41 because it is thin. In other words, the thicker the fluid, the harder it is for a cyclist to pump it.

As illustrated in FIGS. 1 and 3, the conduit system comprises of a small diameter conduit line 42 for transmitting hydraulic fluid from the pump unit 20 and a large diameter conduit line 44 for returning hydraulic fluid from the hydraulic motor 30. A first end 46 of the large diameter conduit line 44 is coupled in fluid communication to the reservoir 60 and a second end 48 of the large diameter conduit line 44 is coupled in fluid communication with the hydraulic motor 30. As for the small diameter conduit line 44, a first end 45 of the small diameter conduit line 42 is coupled in fluid communication with the pump unit 20 and a second end 47 is coupled in fluid communication with the hydraulic motor 30.

It is preferred that a small diameter line, in comparison to a larger diameter line which is to be used to transmit hydraulic fluid from the pump unit 20 to the hydraulic motor 30, be used in the present invention so that the hydraulic fluid coming back to the pump unit 20 comes back slowly and, therefore, will not have any significant back pressure upon the pump unit 20. In other words, the larger diameter line is a low pressure line and the smaller diameter line is a high pressure line. In one version of the present invention, couplings 43 are coupled to each end of the conduit lines 42 and 44 which thread into the pump and motor housings 22, 32 and the reservoir 60, respectively, thereby securing the conduit lines 42 and 44 so that hydraulic fluid may be circulated through the closed hydraulic system 41.

As shown in FIG. 1, the hydraulic fluid reservoir 60 is disposed above the pump unit 20. The hydraulic conduit system 42, 44 is coupled to and in fluid communication with the reservoir 60. Preferably, the reservoir 60 is disposed in the seat tube 14 such that the reservoir 60 is then over the top of the pump unit 20. Below the reservoir 60 is an inlet 68, as shown in FIG. 1, which allows fluid to flow into the pump unit 20. Also, the reservoir 60 includes a fill means 62 coupled in fluid communication with the reservoir 60. The fill means 62 allows for the reservoir 60 to be filled with hydraulic fluid. The fill means 62, in one embodiment of the present invention, comprises a closure means 64 for selectively opening and closing the fill means 62. As illustrated in FIG. 1, an internally threaded cap 64 may be threadably engaged over a fill tube 62.

Figure 5:
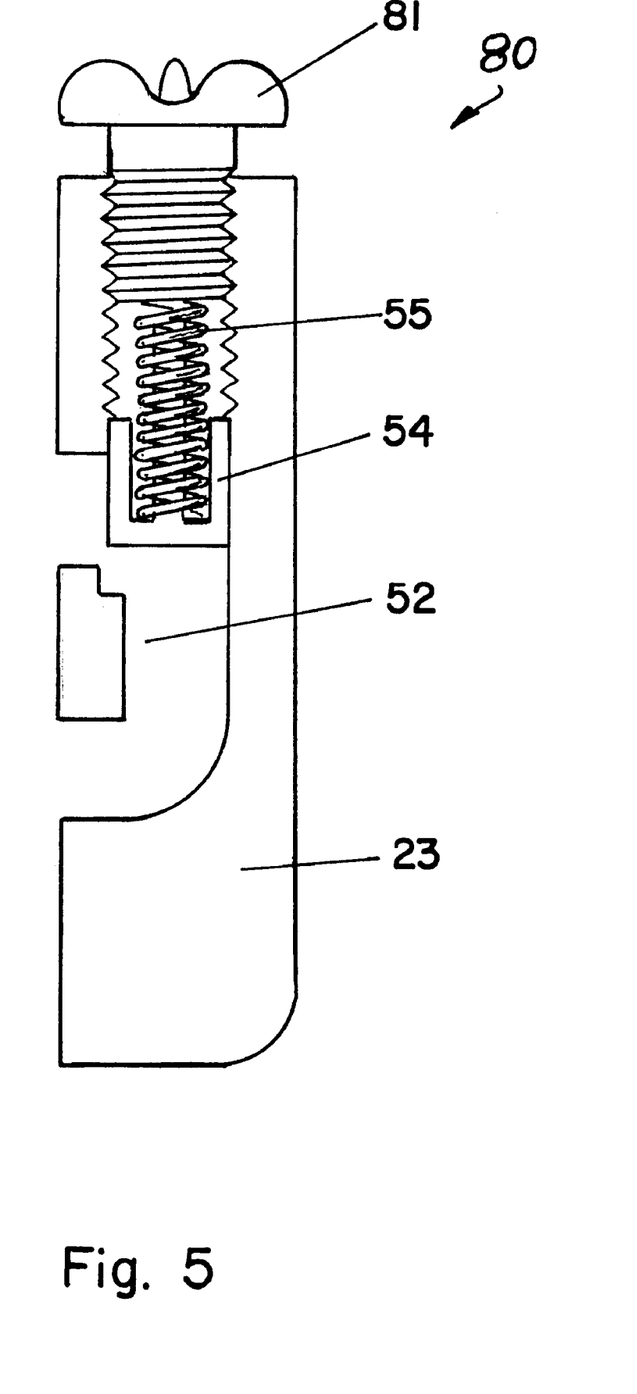
FIG. 5 is side cross-sectional view of the cover plate of the pump housing.

The present invention further comprises a pressure regulator means 52, 54 in the closed hydraulic system 41 for controlling the quantity of hydraulic fluid transmitted to the hydraulic motor 30 when the pedals 6 are rotated. The pressure regulator means comprises a hydraulic fluid bypass 52 in the pump unit 20. The bypass 52 has a spring-loaded plunger 54 interposed in the bypass 52. The spring tension of the spring-load plunger 54 is adjustable so that the amount of bypassing hydraulic fluid bypassing the closed hydraulic system 41 may be controlled. Preferably, the plunger 54 is hollow on one end with the spring 55 inside as shown in FIG. 5.

When the bicyclist is in the stationary position, the pressure about the closed hydraulic system 41 is zero. Then when the bicyclist starts off pedaling, the bike will increase speed with the increasing hydraulic pressure in the closed system 41. The hydraulic pressure will increase up to a point at which is set by selecting a spring-loaded plunger 54 of a specific tensile strength. Beyond this point, hydraulic fluid bypasses the rotating gears in the pump unit 20. When the pressure drops, as a result of the decreased speed of the bike, the spring-loaded plunger 54 blocks further bypassing of hydraulic fluid.

The present invention may further comprise a manually adjustable control means 80 coupled to the pressure regulator means 52 for adjusting the pressure in the closed hydraulic system 41. The adjustable control means 80 thereby controls the speed at which the bicycle is propelled for a constant rate of rotation of the pedal means 6 driving the pump unit 20. In the preferred embodiment, the spring-loaded plunger 54 includes a thumb screw or wing nut 81 for manually adjusting the spring tension of the plunger 54 so as to control the amount of hydraulic fluid bypassing the closed hydraulic system 41. The thumb screw or wing nut 81 is shown in FIG. 5. Loosening the wing nut 81 raises the plunger 54 and, therefore, lets pressure off the high pressure line. Also, substituting for a stronger spring would then increase the pressure in the high pressure line.

Attention now is directed to the rotary motion relationship between the gears of the first gear assembly 24, 26 and the second gear assembly 34, 36. The following definition will aid in understanding the specification. By rotary motion relationship, the inventor means the relative dimensions between the configurations of gears comprising each gear assembly respectively. The rotary motion relationship between the pump unit 20 and the hydraulic motor 30 is configured by varying combinations of the width and whole depth of the gear teeth in the first and second gear assemblies. The present invention depends upon the relation of the rotating gears in the pump unit 20 and the hydraulic motor 30 to generate hydraulic pressure and facilitate hydraulic fluid about the closed hydraulic system 41. The ratio for a particular bicyclist depends ultimately upon the age of the bicyclist and the intended purpose of the bike.

For example, the first and second gear assemblies each have teeth 70 respectively. The teeth 70 upon a gear mesh together with the teeth 70 of an adjacent gear to form inter-tooth pockets 72 which facilitate hydraulic fluid transfer. The teeth 70 have a face width w and a whole depth d. The whole depth d is defined by the radial distance between the bottom land and the top land of each tooth which forms the inter-tooth pockets 72. After extensive investigation and experimentation, the inventor has discovered these variables may be adjusted to more effectively facilitate the hydraulic fluid about the closed hydraulic system 41. The inventor discovered that the effective range of the rotary motion relationship of the present invention varies from 2.5:1 to 18:1. Simply, a 1:1 ratio as disclosed in the prior art is not effectively operable because of the relative sizes of the gears and the weight of the hydraulic fluid.

However, for general biking use, it is particularly preferable that the rotary motion relationship be approximately 12:1. In one embodiment the 12:1 relationship may be obtained by having the teeth 70 of the first gear assembly 24, 26 have a face width $w_1$ six times as wide as the teeth 70 of the second gear assembly 34, 36 which have a face width $w_2$. Also, the teeth 70 of the first gear assembly 24, 26 then have a whole depth $d_1$ approximately twice as high as the teeth 70 of the second gear assembly 34, 36 having a depth $d_2$ which thereby define a rotary motion relationship of approximately 12:1. Simply, in this embodiment, it then takes twelve of the teeth 70 on the second gear assembly 34, 36 to move hydraulic fluid from one of the teeth 70 of the first gear assembly 24, 26. Or in other words, it takes twelve inter-tooth pockets 42 in the hydraulic motor 30 to move the hydraulic fluid pumped by one inter-tooth pocket 42 in the pump unit 20.

The previously described embodiments of the present invention have many advantages, including providing for a smooth transition from a resting position to a higher speed without the usual shifting of gears as is encountered on conventional multi-speed bicycles.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A bicycle having a drive mechanism, a frame comprising of a seat tube, seat stay and chain stay, a pedal means for applying manual power to propel the bicycle, a drive wheel rotatably supported on the frame, and a drive mechanism connected to the pedal means for rotating the drive wheel, the drive mechanism comprising:

a pump unit comprising a pump housing, a first gear assembly operationally disposed within said pump housing and driven by the rotation of the pedal means outside of said pump housing, said pump unit outwardly adjacent the seat tube and the chain stay;

a hydraulic motor being supported on the frame, said hydraulic motor comprising a motor housing and a second gear assembly operationally disposed within said motor housing, said second gear assembly adapted to engage the drive wheel, said hydraulic motor outwardly adjacent the seat stay and the chain stay and driven by the hydraulic fluid pumped by said pump unit, said pump unit and said hydraulic motor having a rotary motion relationship in the range of approximately 2.5:1 up to approximately 18:1;

conduit means coupled between said hydraulic motor and said pump unit for circulating hydraulic fluid through said pump unit and said hydraulic motor, said conduit means creating a closed hydraulic system;

pressure regulator means in said closed hydraulic system for controlling the quantity of hydraulic fluid transmitted to said hydraulic motor when the pedal means is rotated;

a hydraulic fluid reservoir disposed above said pump unit, said conduit means coupled to and in fluid communication with said reservoir; and said second gear assembly comprising a smaller pinion gear and a larger idle gear in rotational meshing contact with one another, said smaller pinion gear driving the drive wheel.

2. A bicycle having a drive mechanism, a frame comprising of a seat tube, seat stay and chain stay, a pedal means for applying manual power to propel the bicycle, a drive wheel rotatably supported on the frame, and a drive mechanism connected to the pedal means for rotating the drive wheel, the drive mechanism comprising:

a pump unit comprising a pump housing, a first gear assembly operationally disposed within said pump housing and driven by the rotation of the pedal means outside of said pump housing, said pump unit outwardly adjacent the seat tube and the chain stay;

a hydraulic motor being supported on the frame, said hydraulic motor comprising a motor housing and a second gear assembly operationally disposed within said motor housing, said second gear assembly adapted to engage the drive wheel, said hydraulic motor outwardly adjacent the seat stay and the chain stay and driven by the hydraulic fluid pumped by said pump unit, said pump unit and said hydraulic motor having a rotary motion relationship in the range of approximately 2.5:1 up to approximately 18:1;

conduit means coupled between said hydraulic motor and said pump unit for circulating hydraulic fluid through said pump unit and said hydraulic motor, said conduit means creating a closed hydraulic system;

pressure regulator means in said closed hydraulic system for controlling the quantity of hydraulic fluid transmitted to said hydraulic motor when the pedal means is rotated;

a hydraulic fluid reservoir disposed above said pump unit, said conduit means coupled to and in fluid communication with said reservoir; and said conduit means comprising a small diameter conduit line for transmitting hydraulic fluid from said pump unit and a large diameter conduit line for returning hydraulic fluid from said hydraulic motor.

3. A bicycle as claimed in claim 2 wherein a first end of said large diameter conduit line is coupled in fluid communication to said reservoir and a second end of said large diameter conduit line is coupled in fluid communication with said hydraulic motor.

4. A bicycle as claimed in claim 2 wherein a first end of said small diameter conduit line is coupled in fluid communication with said pump unit and a second end of said small diameter conduit line is coupled in fluid communication with said hydraulic motor.

5. A bicycle having a drive mechanism, a frame comprising of a seat tube, seat stay and chain stay, a pedal means for applying manual power to propel the bicycle, a drive wheel rotatably supported on the frame, and a drive mechanism connected to the pedal means for rotating the drive wheel, the drive mechanism comprising:

a pump unit comprising a pump housing, a first gear assembly operationally disposed within said pump housing and driven by the rotation of the pedal means outside of said pump housing, said pump unit outwardly adjacent the seat tube and the chain stay;

a hydraulic motor being supported on the frame, said hydraulic motor comprising a motor housing and a second gear assembly operationally disposed within said motor housing, said second gear assembly adapted to engage the drive wheel, said hydraulic motor outwardly adjacent the seat stay and the chain stay and driven by the hydraulic fluid pumped by said pump unit, said pump unit and said hydraulic motor having a rotary motion relationship in the range of approximately 2.5:1 up to approximately 18:1;

conduit means coupled between said hydraulic motor and said pump unit for circulating hydraulic fluid through said pump unit and said hydraulic motor, said conduit means creating a closed hydraulic system;

pressure regulator means in said closed hydraulic system for controlling the quantity of hydraulic fluid transmitted to said hydraulic motor when the pedal means is rotated;

a hydraulic fluid reservoir disposed above said pump unit, said conduit means coupled to and in fluid communication with said reservoir; and said pressure regulator means comprising a hydraulic fluid bypass in said pump unit for controlling the amount of hydraulic fluid in said closed hydraulic circuit, said hydraulic fluid bypass having a spring-loaded plunger interposed in said bypass.

6. A bicycle as claimed in claim 5 wherein said pressure regulator means further comprises a manually adjustable control means coupled to said pressure regulator means for adjusting the pressure in said closed hydraulic system thereby controlling the speed at which the bicycle is propelled for a constant rate of rotation of the pedal means driving said pump unit.

7. A bicycle having a drive mechanism, a frame comprising of a seat tube, seat stay and chain stay, a pedal means for applying manual power to propel the bicycle, a drive wheel rotatably supported on the frame, and a drive mechanism connected to the pedal means for rotating the drive wheel, the drive mechanism comprising:

a pump unit comprising a pump housing, a first gear assembly operationally disposed within said pump housing and driven by the rotation of the pedal means outside of said pump housing, said pump unit outwardly adjacent the seat tube and the chain stay;

a hydraulic motor being supported on the frame, said hydraulic motor comprising a motor housing and a second gear assembly operationally disposed within said motor housing, said second gear assembly adapted to engage the drive wheel, said hydraulic motor outwardly adjacent the seat stay and the chain stay and driven by the hydraulic fluid pumped by said pump unit, said pump unit and said hydraulic motor having a rotary motion relationship in the range of approximately 2.5:1 up to approximately 18:1;

conduit means coupled between said hydraulic motor and said pump unit for circulating hydraulic fluid through said pump unit and said hydraulic motor, said conduit means creating a closed hydraulic system;

pressure regulator means in said closed hydraulic system for controlling the quantity of hydraulic fluid transmitted to said hydraulic motor when the pedal means is rotated;

a hydraulic fluid reservoir disposed above said pump unit, said conduit means coupled to and in fluid communication with said reservoir;

said first and second gear assemblies each having teeth respectively, said respective teeth meshing together to form inter-tooth pockets, said inter-tooth pockets facilitating hydraulic fluid transfer; and said teeth of said first gear assembly having a face width approximately six times as wide as said teeth of said second gear assembly and said teeth of said first gear assembly have a whole depth approximately twice as high as said teeth of said second gear assembly, thereby defining a rotary motion relationship of approximately 12:1.

8. A bicycle having a drive mechanism, a frame comprising of a seat tube, seat stay and chain stay, a pedal means for applying manual power to propel the bicycle, a drive wheel rotatably supported on the frame, and a drive mechanism connected to the pedal means for rotating the drive wheel, an improved drive mechanism comprising:

a pump unit comprising a pump housing and a first gear assembly, said first gear assembly comprising a pump idler gear and pump bull gear in rotational meshing contact with one another and operationally disposed within said pump housing, said pump bull gear driven by the rotation of the pedal means outside of said pump housing, said pump unit outwardly adjacent the seat tube and the chain stay;

a hydraulic motor being supported on the frame, said hydraulic motor comprising a motor housing and a second gear assembly, said second gear assembly comprising a smaller pinion gear and a larger idle gear in rotational meshing contact with one another and operationally disposed within said motor housing, said smaller pinion gear adapted to engage the drive wheel, said hydraulic motor outwardly adjacent the seat stay and the chain stay and driven by the hydraulic fluid pumped by said pump unit, said pump unit and said hydraulic motor having a rotary motion relationship configured by combinations of said first and second gear assemblies, said first and second gear assemblies having teeth meshing together to form inter-tooth pockets, said inter-tooth pockets facilitating hydraulic fluid transfer, said teeth of said first and second gear assemblies having a face width and a whole depth defining approximately a 12:1 rotary motion relationship;

a conduit means for transmitting hydraulic fluid from said pump unit to said hydraulic motor and returning the hydraulic fluid from said hydraulic motor to said pump unit, said conduit means comprising of a small diameter conduit line for transmitting hydraulic fluid from said pump unit and a large diameter conduit line for returning hydraulic fluid from said hydraulic motor, said conduit means creating a closed hydraulic system;

pressure regulator means for controlling the quantity of hydraulic fluid transmitted to said hydraulic motor when the pedal means is rotated, said pressure regulator means comprising a hydraulic fluid bypass in said pump unit, said hydraulic fluid bypass having a spring-loaded plunger interposed in said bypass; and a hydraulic fluid reservoir disposed within the seat tube and above said pump unit, said large diameter conduit line having a first end coupled to said reservoir and in fluid communication with said reservoir.

9. A bicycle as claimed in claim 8 wherein a second end of said large diameter conduit line is coupled in fluid communication with said hydraulic motor.

10. A bicycle as claimed in claim 8 wherein a first end of said small diameter conduit line is coupled in fluid communication with said pump unit and a second end of said small diameter conduit line is coupled in fluid communication with said hydraulic motor.

11. A bicycle as claimed in claim 8 wherein said reservoir includes a fill means coupled in fluid communication with said reservoir for filling said reservoir with hydraulic fluid.

12. A bicycle as claimed in claim 11 wherein said fill means comprises a closure means for selectively opening and closing said fill means.

13. A bicycle as claimed in claim 8 further comprising a quantity of hydraulic fluid in said closed hydraulic system.

* * * * *